(12) United States Patent
McWilliams

(10) Patent No.: US 11,142,052 B1
(45) Date of Patent: Oct. 12, 2021

(54) ADVANCED TARPAULIN SUPPORT BRACKET ASSEMBLY

(71) Applicant: Clifford O. McWilliams, Owasso, OK (US)

(72) Inventor: Clifford O. McWilliams, Owasso, OK (US)

(*) Notice: Subject to any disclaimer, the term of this patent is extended or adjusted under 35 U.S.C. 154(b) by 0 days.

(21) Appl. No.: 16/911,689

(22) Filed: Jun. 25, 2020

Related U.S. Application Data

(60) Provisional application No. 62/866,298, filed on Jun. 25, 2019.

(51) Int. Cl.
*B60J 7/10* (2006.01)
*B60P 7/04* (2006.01)

(52) U.S. Cl.
CPC .............. *B60J 7/104* (2013.01); *B60P 7/04* (2013.01)

(58) Field of Classification Search
CPC ................................... B60J 7/104; B60J 7/04

USPC .................................................. 296/100.17
See application file for complete search history.

(56) References Cited

U.S. PATENT DOCUMENTS

| | | | | |
|---|---|---|---|---|
| 5,487,584 A * | 1/1996 | Jespersen | ................. | B60J 7/102 135/144 |
| 5,860,547 A * | 1/1999 | Cozzolino | ............... | B60P 1/286 220/1.5 |
| 5,873,210 A * | 2/1999 | Brumleve | ................ | B60J 7/102 296/100.17 |
| 9,469,353 B1 * | 10/2016 | McWilliams | .......... | B62D 29/04 |

* cited by examiner

*Primary Examiner* — Joseph D. Pape
(74) *Attorney, Agent, or Firm* — Head, Johnson, Kachigian & Wilkinson, PC

(57) ABSTRACT

A bracket assembly for a tarpaulin support device for an open top of a trailer or vehicle. The bracket may have an axial bore and one or more vertical bores for receiving an end or socket of a bow assembly. The bracket may interchangeably hold a variety of bow assemblies, such as a traditional curved bow, a rod, one or more concentric tubes, or a combination of one or more tubes and a rod. The bracket assembly may comprise a plurality of brackets for holding a series of bow assemblies in place on a trailer or vehicle.

17 Claims, 8 Drawing Sheets

ADVANCED TARPAULIN SUPPORT BRACKET ASSEMBLY

CROSS REFERENCE

This application is based on and claims priority to U.S. Patent Application No. 62/866,298 filed Jun. 25, 2019.

BACKGROUND OF THE INVENTION

Field of the Invention

This invention relates generally to a tarpaulin support device for semi-trailers, and more particularly, but not by way of limitation, to an advanced tarpaulin support bracket assembly.

Description of the Related Art

As noted in Stephens et al., U.S. Pat. No. 5,664,824, incorporated by reference herein, tractor trailers used to haul loose material, such as sand and gravel, will often employ a tarpaulin cover over the open top of the trailer having a bottom and a pair of opposed side walls. The tarpaulin discourages any of the loose material from falling or being blown off during transportation. A series of curved bows extending laterally across the open top form a support for the tarpaulin. Use of a tarpaulin which is arched at the center provides a number of advantages. Rainwater will run off of the load more easily. Additionally, the arched center accommodates high loads. In the case of sand and gravel, loading of these materials is often preceded by removal of the bows in order to avoid damage. Loading of these materials through the open top will often dent, twist, and break the support bows.

Stephens et al. solves this problem by making the bow flexible. Specifically, Stephens et al. teaches a tarpaulin support device for an open top of a trailer, vehicle, or the like, where the device includes a flexible and resilient pole made of nylon composite which, although sturdy, is both flexible and resilient. The pole is normally straight but, when installed, bows outwardly away from the floor of the trailer. The pole will flex and deflect if sand, gravel, or other materials impact the pole during loading operations or in the event of impact from an end loader or other loading equipment used during the loading operation. Thus, the pole may be kept in place during loading of the trailer.

The pole of Stephens et al. is mounted to the trailer via opposing brackets, where each bracket is attached to the trailer and each has a non-cylindrical opening therein. A first socket and a second socket each have a receptacle to receive one of the pole ends, each socket terminating in a non-cylindrical post receivable in one of the openings to retain the sockets and retain the pole and to prevent radial movement of the pole.

Despite its many advantages, there are certain drawbacks to the Stephens et al. device. Notably, the nylon of the pole tends to become rough through use, causing the tarpaulin to wear and eventually tear. Additionally, the nylon tends to crack in both cold and heat. The nylon pole can be costly to replace, particularly considering the fact that a single trailer requires multiple poles. Another drawback of the Stephens et al. device is that, over time, it tends to cause the walls of the trailer to deflect outward.

The drawbacks to the Stephens et al. device were addressed in U.S. Pat. Nos. 9,469,353, D768,555, 9,522,705, and 9,701,349, all to McWilliams and all of which are incorporated herein by reference. In particular, the McWilliams '705 patent addresses a bracket assembly for a tarpaulin support device.

It is desirable to improve the bracket assembly of the McWilliams '705 patent by providing an advanced bracket assembly that is less expensive to manufacture.

It is further desirable for such an advance bracket assembly to be usable interchangeably with any of the flexible tube assemblies of the McWilliams and Stephens et al. patents and with standard tarp bows.

SUMMARY OF THE INVENTION

In general, in a first aspect, the invention relates to a bracket assembly for a tarpaulin support device for an open top of a trailer or vehicle, the bracket assembly comprising: a first bracket comprising a body with a front, a back, a top, a bottom, a first side, and a second side; an axial bore extending from the front at least partially to the back such that the front is open to the bore; and one or more vertical bores extending from the bottom at least partially to the top such that the bottom is open to the vertical bores, where the one or more vertical bores are in fluid communication with the axial bore.

The axial bore may extend to the back such that the back is open to the bore. The one or more vertical bores may extend to the top such that the top is open to the vertical bores and the vertical bores intersect the axial bore. The axial bore may have a cylindrical cross section and the one or more vertical bores may have square cross sections. The axial bore may extend at an upward angle of 20 to 25 degrees.

The first side and the second side may be parallelograms, such that the body extends at an upward angle of 20 to 25 degrees. The body may be a parallelepiped.

The bracket assembly may further comprise one or more legs extending from the body and attached to a side wall of the trailer or vehicle. A gap may be formed between at least a portion of the body and the side wall. The gap may be adjacent the axial bore.

The bracket assembly may further comprise a second bracket and a bow assembly.

In a second aspect, the invention relates to a bracket for a tarpaulin support device for an open top of a trailer or vehicle, the bracket comprising: a body with a front and a back, the body comprising a first sidewall; a second sidewall, where the second sidewall is parallel to the first sidewall; a front web spanning the first sidewall and the second sidewall at the front of the body; a back web spanning the first sidewall and the second sidewall nearer the back of the body than the front web; an intermediate web spanning the first sidewall and the second sidewall between the front web and the back web; and a hole in the front web and a corresponding hole in the intermediate web, where the hole in the front web aligns with the corresponding hole in the intermediate web; where the front web, the intermediate web, the first sidewall, and the second sidewall define a front vertical bore and the intermediate web, the back web, the first sidewall, and the second sidewall define a back vertical bore.

The hole in the front web and the corresponding hole in the intermediate web may be capable of receiving an end or socket of a tarpaulin support device. The front vertical bore and the back vertical bore may each be capable of receiving an end or socket of a tarpaulin support device. The front vertical bore and the back vertical bore may be different sizes. The first sidewall and the second sidewall may be parallelograms, such that the body angles upward from back to front. The bracket may further comprise one or more legs extending from the body, where the body is capable of being attached to a side wall of the trailer or vehicle via the legs.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
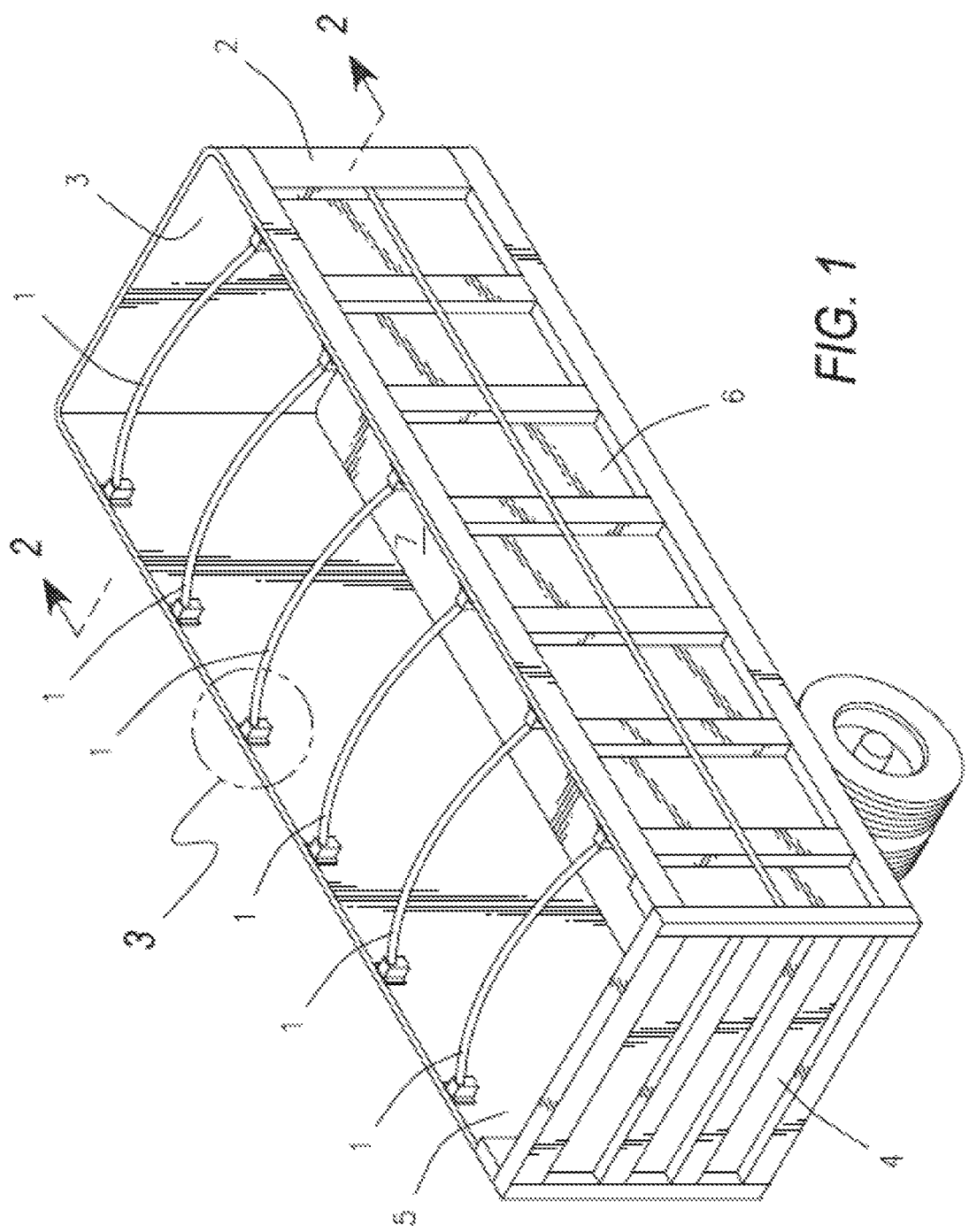
FIG. 1 is a perspective view of a semi-trailer with multiple flexible tarpaulin support devices installed thereon.

In general, in a first aspect, the invention relates to a bracket or brackets for holding a tarpaulin support device 1, as shown in the Figures. As seen in FIG. 1, one or more of the tarpaulin support devices 1 may be used on a semi-trailer 2 or other vehicle. The trailer 2 may include a front end wall 3; an opposed rear end 4 which may include a removable or swinging gate that may be closed during loading and transportation and open for unloading; a pair of opposed side walls 5 and 6; and a floor 7. The trailer 2 may have an open top, which may be covered by a tarpaulin after the trailer 2 has been loaded with sand, gravel, or other material to discourage any of the loose material from falling or being blown off during transportation.

Figure 2:
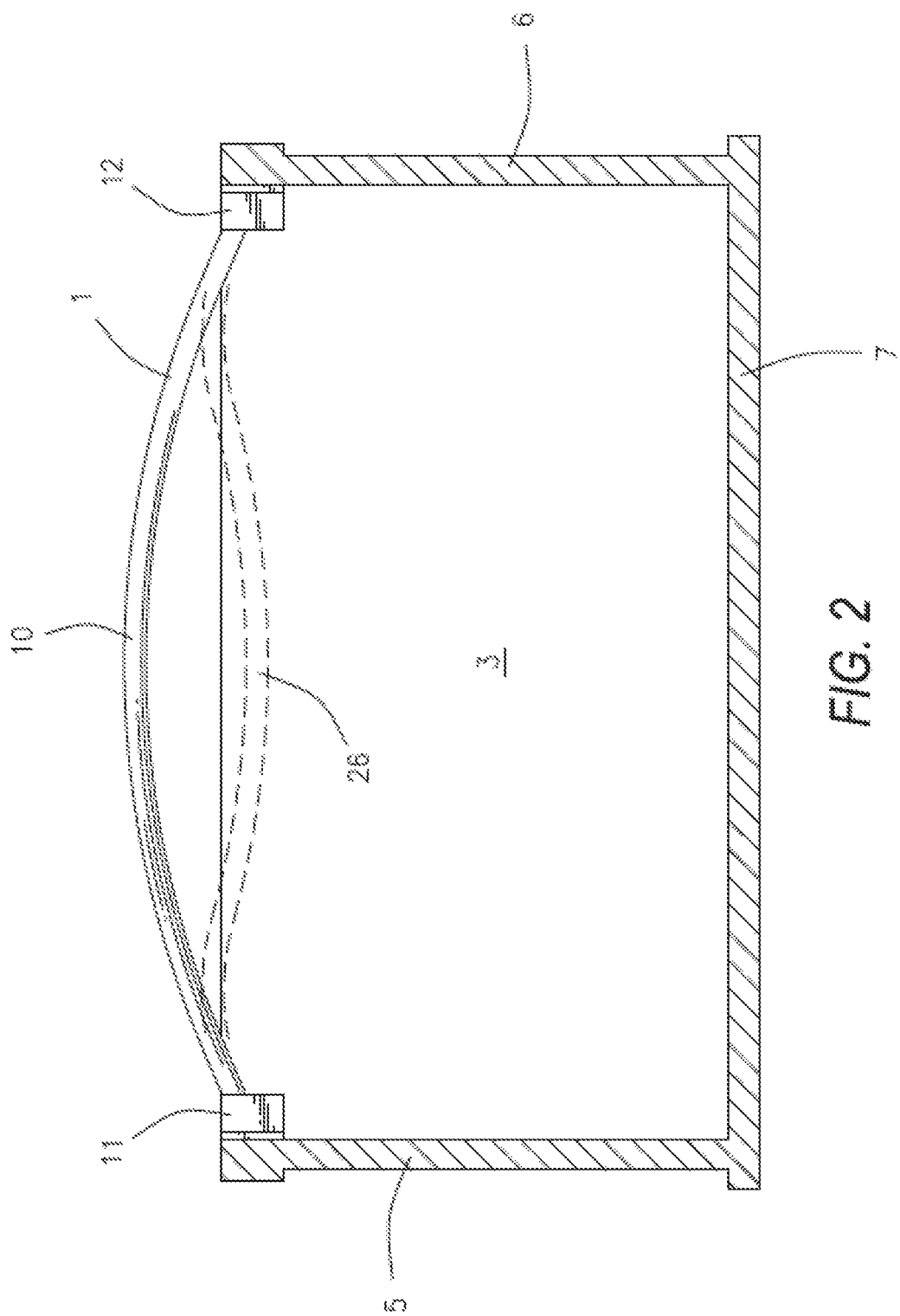
FIG. 2 is a sectional view taken along section line 2-2.
Figure 3:
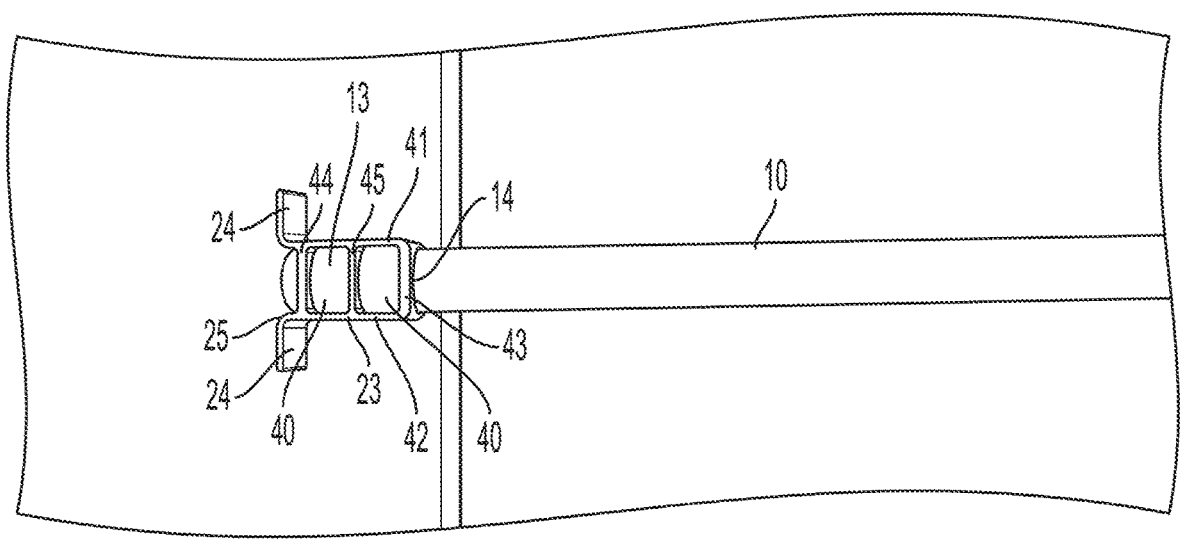
FIG. 3 is a top perspective view of a bracket assembly installed on a semi-trailer wall, supporting a flexible tarpaulin support.
Figure 4:
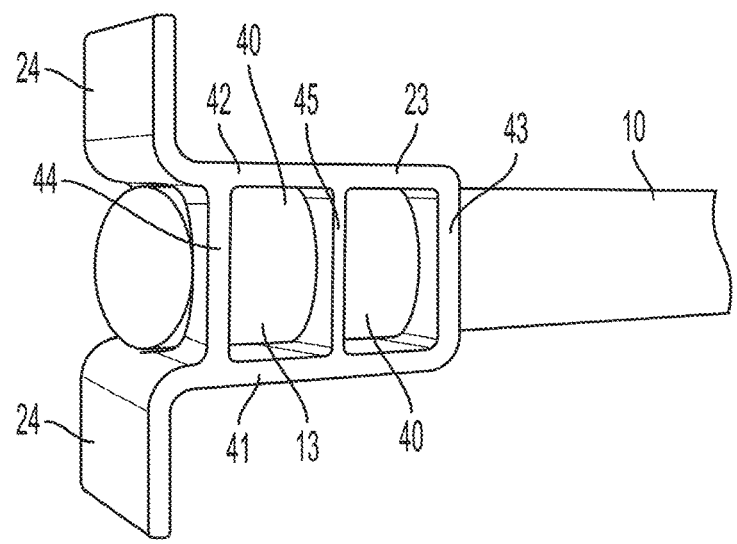
FIG. 4 is a bottom perspective view of the bracket assembly with a flexible tarpaulin support in place therein, where the bracket assembly is not installed on a semi-trailer wall.
Figure 5:
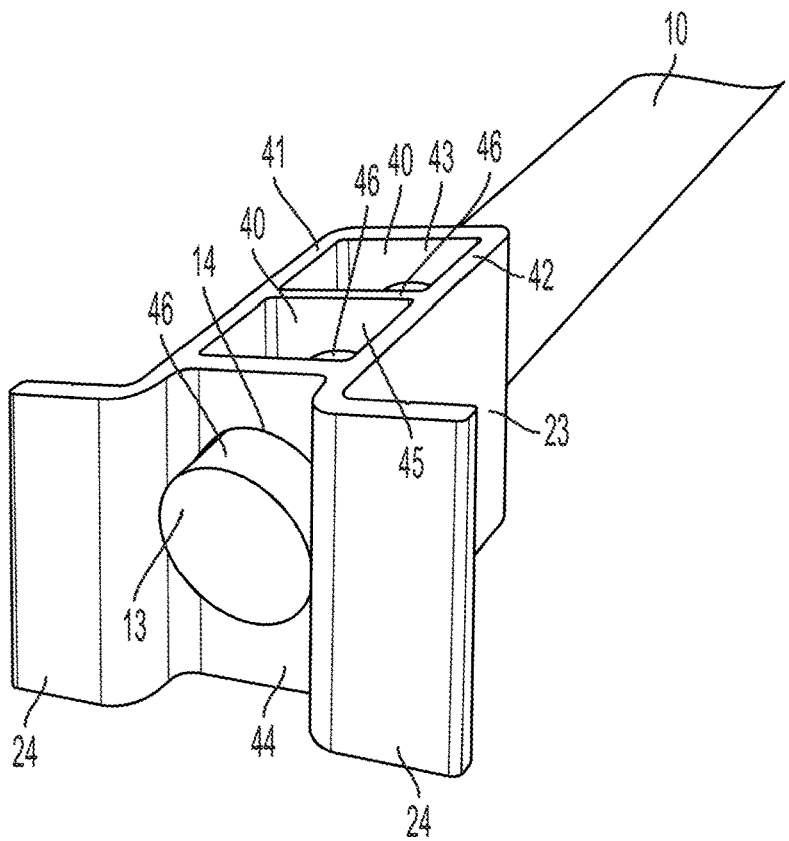
FIG. 5 is back perspective view of the bracket assembly with the flexible tarpaulin support in place therein, where the bracket assembly is not installed on a semi-trailer wall.
Figure 6:
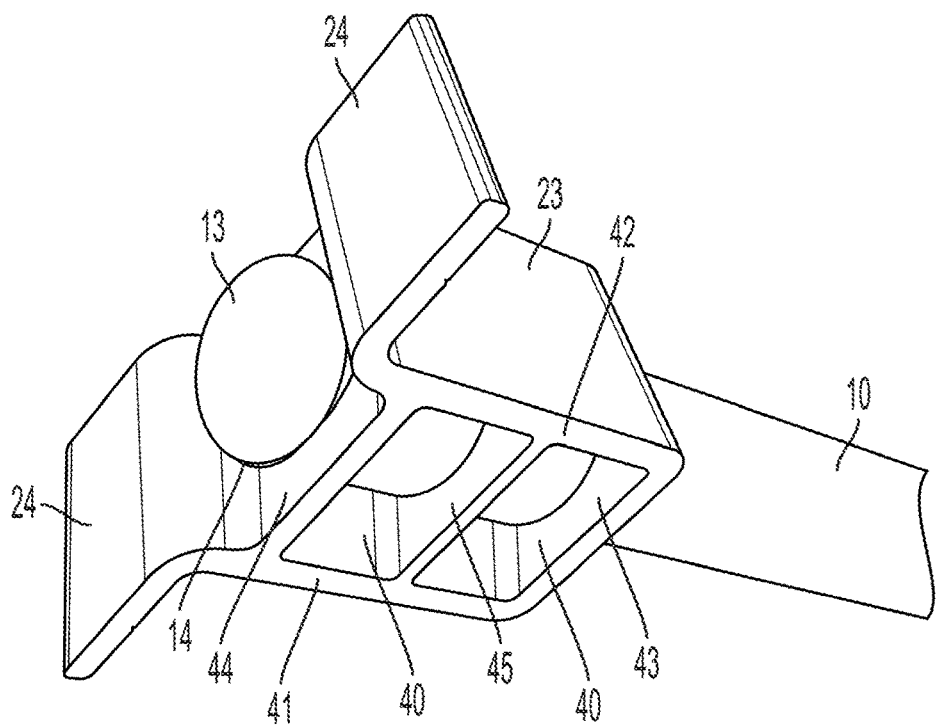
FIG. 6 is a bottom perspective view from a different angle.

Each tarpaulin support device 1 may comprise a bow assembly 10 extending laterally across the open top, as seen in FIGS. 1 and 2. The bow assembly 10 may have a circular cross section, or any other desired cross section, and may be solid or may have a hollow center. The bow assembly 10 may be normally straight. When installed, the bow assembly 10 may be bowed outwardly away from the floor 7 of the trailer 2. By exerting force, the bow assembly 10 may be moved from its normally straight condition to the arched position for use; when the force is released, the bow assembly 10 may return to its straight condition. Alternately, the bow assembly 10 may be normally curved and not require force for use.

The bow assembly 10 may be mounted via a first bracket 11 and a second bracket 12, where the bow assembly 10 has two opposing ends 13 and where one of the ends 13 is receivable in the first bracket 11 and the other end 13 is receivable in the second bracket 12. Specifically, each bracket 11 and 12 may have a cylindrical bore 14 therethrough to receive the ends 13 of the bow assembly 10. It will be understood that other non-cylindrical configurations of the bow assembly 10 and bore 14 might be employed with the same results.

The bow assembly 10 may not be permanently affixed in the brackets 11 and 12. To insert, ends 13 of the bow assembly 10 may be moved axially into the bores 14 of the brackets 11 and 12.

Figure 7:
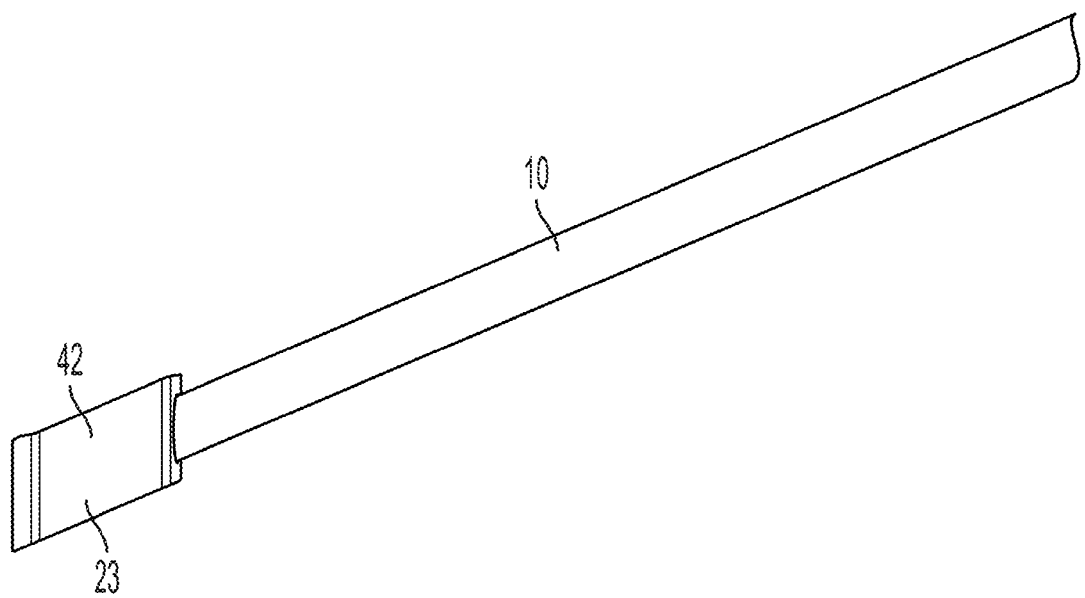
FIG. 7 is a side view of the bracket assembly with the flexible tarpaulin support in place therein, where the bracket assembly is not installed on a semi-trailer wall.
Figure 8:
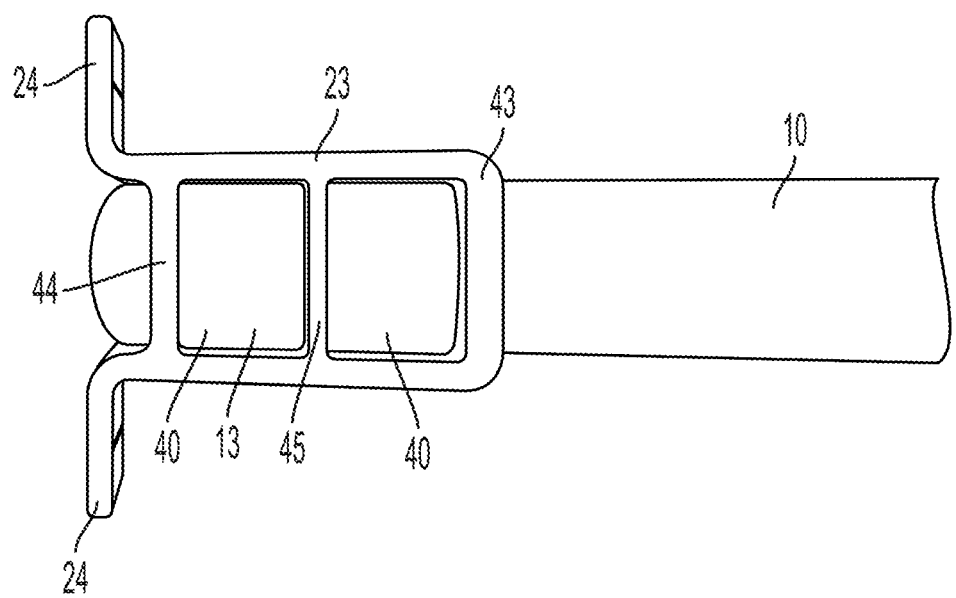
FIG. 8 is a top view of the bracket assembly with the flexible tarpaulin support in place therein.

Each of the first brackets 11 may be attached to the side wall 5 of the trailer 2, while each of the second brackets 12 may be attached to the side wall 6 of the trailer 2. The brackets 11 and 12 may be welded, bolted, or otherwise secured to the side walls 5 and 6. Each of the brackets 11 and 12 may be arranged so that its bore 14 angles downward toward the side wall 5 or 6 to which the bracket 11 or 12 is attached, facilitating the upward arch of the bow assembly 10. Specifically, the bore 14 may angle 20 to 25 degrees, preferably 23 degrees. The entire bracket 11 or 12 may similarly angle, as shown in FIG. 7. When multiple tarpaulin support devices 1 are used on a trailer 2, the bores 14 of each of the first brackets 11 may be parallel to each other, while the bores 14 of each of the second brackets 12 may be parallel to each other.

Brackets 11 and 12 may comprise a body 23 with the bore 14 extending therethrough and one or more legs 24 extending from the body 23. The bore 14 may extend partially through the body 23, or the bore 14 may fully extend through the body 23 such that water may drain through the bore 14 rather than collecting in the body 23. Brackets 11 and 12 may further comprise one or more vertical bores 40. The vertical bores 40 may intersect or otherwise be in fluid communication with the bore 14 such that water may drain through the vertical bores 40 rather than collecting in the body 23. The vertical bores 40 may fully extend through the body 23 from the top of the body 23 to the bottom of the body 23, or alternately may partially extend from the bore 14 to the bottom of the body 23. If water were to collect within the body 23, it may freeze, expand, and break the body 23. Allowing water to drain through the bore 14 and/or vertical bores 40 may prevent such damage. The bore 14 and/or vertical bores 40 may also prevent the collection of dust within the body 23, where it may otherwise seize the bow assembly 10 or break the body 23.

In addition to allowing drainage, the vertical bores 40 may also receive the ends 13 of the bow assembly 10, allowing the brackets 11 and 12 to be used in conjunction with traditional bow assemblies 10. As noted above, traditional tarp bows often have a socket 46 at each end, each of which has a post that is receivable in an opening in a bracket. The vertical bores 40 of brackets 11 and 12 may function as those openings, receiving the socket 46 of a traditional bow assembly 10 and thus retaining the bow assembly 10. As such, a single set of brackets 11 and 12 may be used interchangeably with a variety of bow assemblies 10, including traditional steel bows, traditional flexible bows, and the tube assemblies described in the McWilliams patents.

Figure 11:
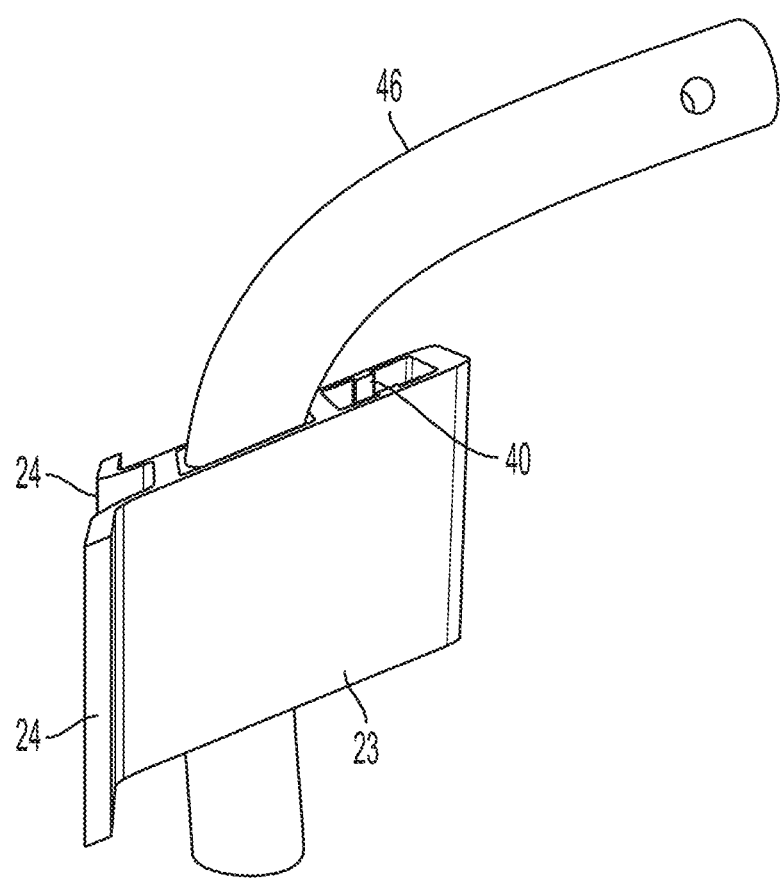
FIG. 11 is a side perspective view of the bracket assembly with a tarp bow socket in place therein.
Figure 12:
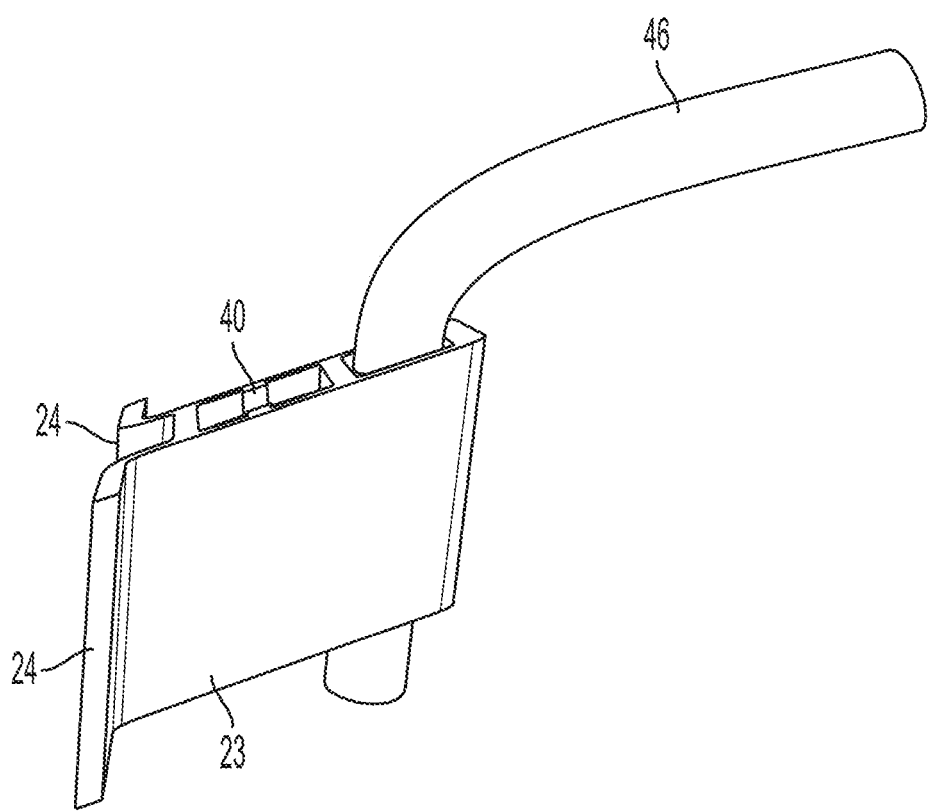
FIG. 12 is a side perspective view of a bracket assembly with a different sized tarp bow socket in place therein.

The vertical bores 40 may be different sizes, and thus may accommodate different sizes of traditional tarp bow sockets, as shown in FIGS. 11 and 12. For example, the body 23 may have a front vertical bore 40 that is ¾ inch across and a back vertical bore 40 that is 1 inch across. Alternately, the body 23 may have a single vertical bore 40.

Figure 9:
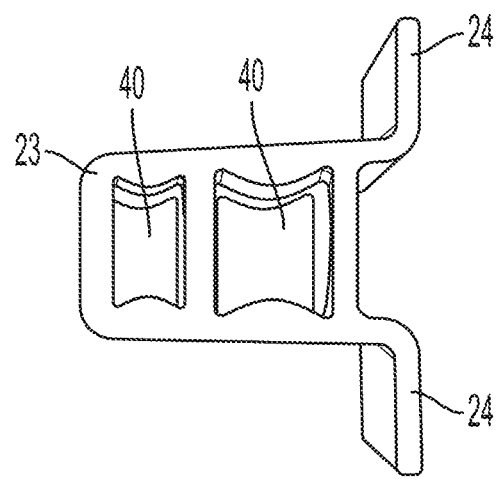
FIG. 9 is a bottom view of the bracket assembly.
Figure 10:
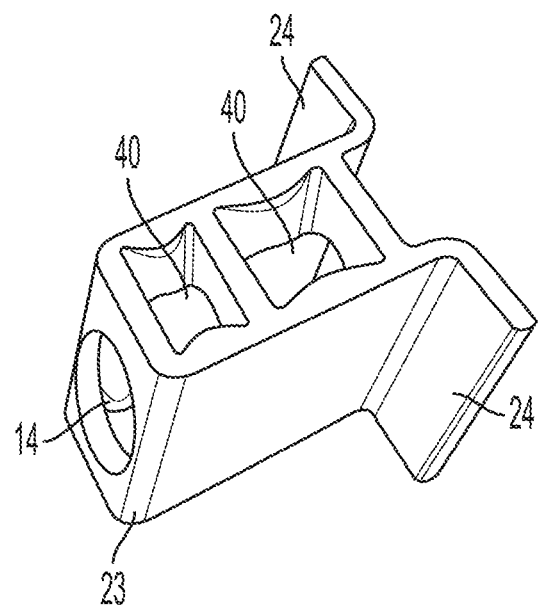
FIG. 10 is a bottom perspective view of the bracket assembly.

The vertical bores 40 may have a square cross section, as shown in FIGS. 3 through 8; a circular cross section; or a cross section of any other desired shape. For example, as shown in FIGS. 9 and 10, the vertical bores 40 may have a generally square cross section, but with curved sides. Additionally or alternately, the vertical bores 40 may have one or more protrusions to help hold the socket 46 in place therein.

The body 23 may attach to side wall 5 or 6 via the legs 24. The legs 24 may be spaced such that a gap 25 is formed between the side wall 5 or 6 and at least a portion of the body 23. The gap 25 may be located adjacent the bore 14 such that the tube assembly 10 may extend through the bore 14 and terminate at least partially in the gap 25. Alternately, the body 23 may be flush with the side wall 5 or 6, with no gap 25 therebetween.

In particular, the body 23 may comprise a first sidewall 41, a parallel second sidewall 42, a front web 43 spanning the first sidewall 41 and the second sidewall 42 at the front of the body, a back web 44 spanning the first sidewall 41 and the second sidewall 42 at or near the back of the body, and an intermediate web 45 spanning the first sidewall 41 and the second sidewall 42 at a point between the front web 43 and the back web 44. The front web 43, intermediate web 45, first sidewall 41, and second sidewall 42 may define the front vertical bore 40, while the intermediate web 45, back web 44, first sidewall 41, and second sidewall 42 may define the back vertical bore 40. The bore 14 may comprise holes 46 in the front web 43, the intermediate web 45, and the back web 44, where the holes 46 align such that the tube assembly 10 may extend therethrough. Alternately, the bore 14 may comprise holes 46 in the front web 43 and the intermediate web 45, but the back web 44 may be solid, without a hole 46. The legs 24 may extend from the body 23 at the level of the back web 44. Alternately, the legs 24 may be offset from the back web 44, as shown in the Figures, such that the back web 44 is located near, but not at, the back of the body 23, allowing a gap between the back web 44 and the level of the legs 24. The legs 24 may be a single element spanning the entire body 23 or may be two separate legs 24, as shown.

Sidewalls 41 and 42 may be parallelograms. When mounted on a trailer 2, the legs 24 and webs 43, 44, and 45 may all be vertical, with the front web 43 located higher than the intermediate web 45, the intermediate web 45 located higher than the back web 44, and the back web 44 located even with or higher than the legs 24. The body 23 may angle upward away from the trailer wall 5 or 6 at any desired angle; for example, the body 23 may angle upward away from the trailer wall at an angle of 20 to 25 degrees, preferably 23 degrees. The bore 14 may likewise angle, such as at an angle of 23 degrees, while the vertical bores 40 may remain vertical.

Brackets 11 and 12 may optionally each have a hole extending from one side to the bore 14. A bolt or pin may extend through the hole to secure the tube assembly 10, preventing the tube assembly 10 from rotating in the cylindrical bore 14. The bolt or pin may be a bolt, a retainer pin, a drift pin, or any other suitable device for preventing rotation of the tube assembly 10 relative to the body 23 within the bore 14.

During manufacture, the body 23 may be extruded with the vertical bores 40 and legs 24 in place. The bore 14 may be added with a drill press. If the brackets 11 and 12 are to be bolted to the trailer 2, holes may be punched into the legs 24 to accommodate bolts. If the brackets 11 and 12 are to be welded to the trailer 2, the holes may be omitted. The brackets 11 and 12 may be attached to the vehicle and the tube assembly 10 may be placed therein, either in the bores 14 or in the bores 40, depending on the type of tube assembly 10 being used.

Whereas, the devices and methods have been described in relation to the drawings and claims, it should be understood that other and further modifications, apart from those shown or suggested herein, may be made within the spirit and scope of this invention.

What is claimed is:

1. A bracket assembly for a tarpaulin support device for an open top of a trailer or vehicle, the bracket assembly comprising:
    a first bracket comprising a body with a front, a back, a top, a bottom, a first side, and a second side;
    an axial bore extending from the front at least partially to the back such that the front is open to the bore; and
    one or more vertical bores extending from the bottom at least partially to the top such that the bottom is open to the vertical bores, where the one or more vertical bores are in fluid communication with the axial bore.

2. The bracket assembly of claim 1 where the axial bore extends to the back such that the back is open to the bore.

3. The bracket assembly of claim 1 where the one or more vertical bores extend to the top such that the top is open to the vertical bores and the vertical bores intersect the axial bore.

4. The bracket assembly of claim 1 where the axial bore has a cylindrical cross section and the one or more vertical bores have square cross sections.

5. The bracket assembly of claim 1 where the axial bore extends at an upward angle of 20 to 25 degrees.

6. The bracket assembly of claim 1 where the first side and the second side are parallelograms, such that the body extends at an upward angle of 20 to 25 degrees.

7. The bracket assembly of claim 1 where the body is a parallelepiped.

8. The bracket assembly of claim 1 further comprising one or more legs extending from the body and attached to a side wall of the trailer or vehicle.

9. The bracket assembly of claim 8 where a gap is formed between at least a portion of the body and the side wall.

10. The bracket assembly of claim 9 where the gap is adjacent the axial bore.

11. The bracket assembly of claim 1 further comprising a second bracket and a bow assembly.

12. A bracket for a tarpaulin support device for an open top of a trailer or vehicle, the bracket comprising:
    a body with a front and a back, the body comprising:
        a first sidewall;
        a second sidewall, where the second sidewall is parallel to the first sidewall;
        a front web spanning the first sidewall and the second sidewall at the front of the body;
        a back web spanning the first sidewall and the second sidewall nearer the back of the body than the front web;

an intermediate web spanning the first sidewall and the second sidewall between the front web and the back web; and a hole in the front web and a corresponding hole in the intermediate web, where the hole in the front web aligns with the corresponding hole in the intermediate web;

where the front web, the intermediate web, the first sidewall, and the second sidewall define a front vertical bore and the intermediate web, the back web, the first sidewall, and the second sidewall define a back vertical bore.

13. The bracket of claim 12 where the hole in the front web and the corresponding hole in the intermediate web are capable of receiving an end or socket of a tarpaulin support device.

14. The bracket of claim 12 where the front vertical bore and the back vertical bore are each capable of receiving an end or socket of a tarpaulin support device.

15. The bracket of claim 12 where the front vertical bore and the back vertical bore are different sizes.

16. The bracket of claim 12 where the first sidewall and the second sidewall are parallelograms, such that the body angles upward from back to front.

17. The bracket of claim 12 further comprising one or more legs extending from the body, where the body is capable of being attached to a side wall of the trailer or vehicle via the legs.

* * * * *